(12) United States Patent
Tanaka et al.

(10) Patent No.: US 6,222,690 B1
(45) Date of Patent: Apr. 24, 2001

(54) TAPE SPEED SENSOR, CONTROL CIRCUIT USING TAPE SPEED SENSOR AND METHOD OF CONTROLLING TAPE SPEED SENSOR USING CONTROL CIRCUIT

(75) Inventors: Masanobu Tanaka; Tatsumaro Yamashita, both of Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 09/113,661

(22) Filed: Jul. 10, 1998

(30) Foreign Application Priority Data

Jul. 11, 1997 (JP) .................................... 9-186096

(51) Int. Cl.[7] ................. G11B 5/00; G11B 5/09
(52) U.S. Cl. ............... 360/32; 360/73.04; 360/73.14; 360/8; 242/334.4; 356/28; 250/231.14
(58) Field of Search .............. 360/73.04, 73.08, 360/73.14, 8, 32, 26, 51; 242/334.3, 334.4, 413.9; 356/27, 28; 250/231.14, 231.17, 231.18, 231.13, 237 R

(56) References Cited

U.S. PATENT DOCUMENTS

| | | |
|---|---|---|
| 4,295,171 | 10/1981 | Hirota et al. . |
| 4,958,248 | 9/1990 | Trcka . |
| 5,008,763 | 4/1991 | Horino . |
| 5,675,698 | 10/1997 | Choi . |
| 5,696,642 | 12/1997 | Sawamura et al. . |
| 5,748,397 | * 5/1998 | Yamada .................................. 360/32 |

FOREIGN PATENT DOCUMENTS

| | | |
|---|---|---|
| 31 47 526 | 7/1982 | (DE) . |
| 691641 | * 10/1996 | (EP) ........................................ 360/32 |
| 0 571 886 | 12/1993 | (GB) . |
| 0 646 796 | 4/1994 | (GB) . |
| 0630 011 | 12/1994 | (GB) . |
| WO 92 22059 | 12/1992 | (WO) . |

* cited by examiner

Primary Examiner—Alan T. Faber
(74) Attorney, Agent, or Firm—Brinks Hofer Gilson & Lione

(57) ABSTRACT

An error component such as an eccentricity implicated in an encoder itself is superimposed upon a detected value from an FG due to an assembly error of assemblies themselves and in the manufacturing process. As a result, a speed could not be controlled with a high accuracy and wow and flatter could not be reduced. A tape speed (TSS) signal detected and corrected from the tape transport by FG and PG is inputted into a PLL loop within a data controller (TBC) of a reproducing system. A reproduced signal is converted by an A/D converter in response to a reference clock generated therein and this data is temporarily stored in an FIFO. When this data is reconverted by a D/A converter into an analog signal, if this data is sequentially converted at a timing of an absolute control clock of a quartz oscillator, then it is possible to eliminate the error component superimposed upon the head reproduced signal. Thus, from a theory standpoint, it becomes possible to erase the wow and flatter of the drive mechanism system from the head reproduced signal.

14 Claims, 12 Drawing Sheets

FIG. 8A
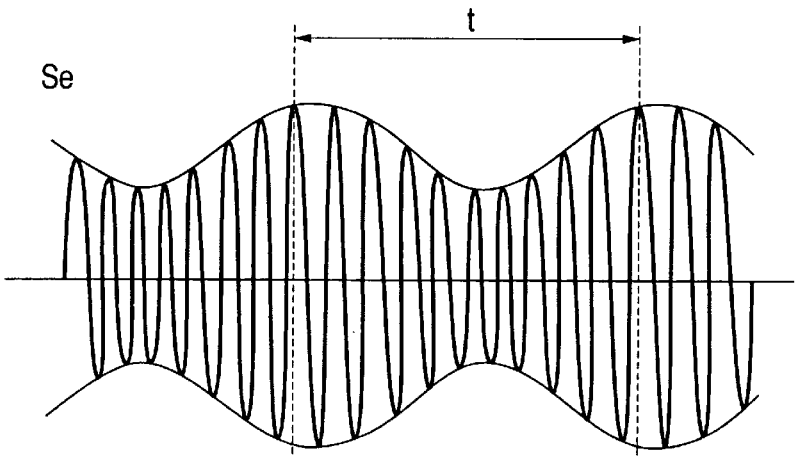
FIG. 8B
FIG. 8C
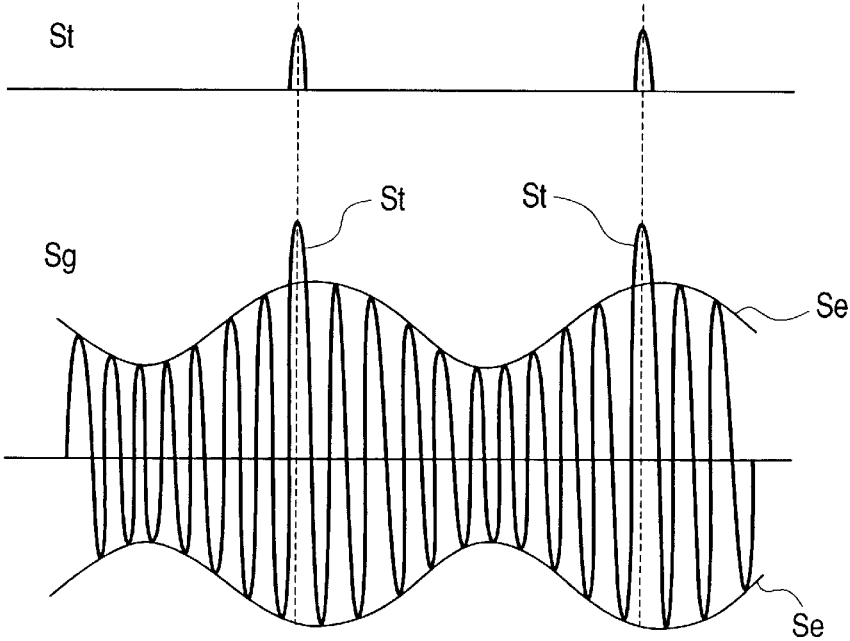

TAPE SPEED SENSOR, CONTROL CIRCUIT USING TAPE SPEED SENSOR AND METHOD OF CONTROLLING TAPE SPEED SENSOR USING CONTROL CIRCUIT

BACKGROUND OF THE INVENTION

1. Field of the Invention

The present invention relates to a tape speed sensor which detects a tape travel speed and a phase in a tape recording/reproducing apparatus or the like and which may correct an error signal caused by a deviation inherent in the tape speed sensor itself, a control circuit using this tape speed sensor and a method of controlling a tape speed sensor by using this control circuit.

2. Description of the Prior Art

FIG. 13 is a diagram showing a rotary encoder according to the prior art.

A rotary encoder 1 shown in FIG. 13 is for use with a tape recording/reproducing apparatus or the like without a capstan, for example, and a rotary shaft 2 of the rotary encoder is rotated as a tape is transported.

The rotary encoder 1 comprises a rotor 3 secured to the rotary shaft 2 and a stator 4 partly opposed to the rotor 3. The rotor 3 has slits 6 which comprise light-passing areas and light-shielding areas alternately formed on a circumference like a bar code. The stator 4 is shaped as a fan having slits partly defined thereon. The slit 6 may coincide with the slit 5 formed on the stator 4 when the rotor 3 is rotated.

A light-emitting diode (LED), for example, or the like is used as a light-emitting element 7, and a photodiode (PD) or the like is used as a light receiving element 8. Light emitted from the light-emitting element 7 is passed through the slits 5, 6 defined on the rotor 3 and the stator 4 and detected by the light receiving element 8, thereby being converted into an electrical signal (envelope signal). A rotation speed of a rotor and a phase displacement can be detected by processing this envelope signal with an electrical means not shown. Thus, the tape recording/reproducing apparatus is able to control a running speed, wow or flatter or the like by feeding these detected values back to a reel motor which controls a tape travel.

In the prior-art rotary encoder 1, since the information indicating that the slits 5, 6 are opposed to each other (envelope signal) is the representative detected value which results from detecting only a part of the whole of the slits 6 defined on the rotor 3, the envelope signal is low in signal level and has much noises so that it is not high in accuracy. Also, to increase the accuracy of the envelope signal, assemblies such as slits have to be finished with a high accuracy and also have to be assembled with a high accuracy. In addition, the semiconductor laser (LD) or the PD of high sensitivity is used as a light source to receive light. There is then the problem that the manufacturing cost increases extremely.

Further, when the shafts of the rotor 3 and the rotary shaft 2 are deviated from each other, an eccentricity occurs in the rotation of the rotor 3. Consequently, the detected value is such one that an error component that the rotary encoder 1 itself contains is superimposed upon the tape running speed and the wow and flatter detected by the rotary encoder 1.

However, since the conventional rotary encoder 1 cannot eliminate the error component contained in the rotary encoder 1 itself, the rotary encoder cannot obtain a more accurate speed and cannot reduce the wow and flatter. Also, even when the encoder itself can be manufactured with a high accuracy, the wow and flatter cannot be eliminated completely. Further, even though the tape speed is controlled by directly accelerating or decelerating the rotation speed of the reel motor, the wow and flatter cannot be eliminated from a standpoint of a delay of a responsiveness of a mechanism system or a standpoint of ability of assembly.

Furthermore, in order to solve the above-mentioned problems and to make the rotary encoder 1 become high in accuracy, the prior art attaches importance to the standpoint of the structure and seeks after the finished accuracy of each assembly and the assembly accuracy. There is then a limit upon reduction of the manufacturing cost.

SUMMARY OF THE INVENTION

In view of the aforesaid aspect, it is an object of the present invention to provide a tape speed sensor in which an accurate cycle of an envelope signal can be detected with a high accuracy and a rotation speed and a phase can be detected with a high accuracy by using a trigger signal obtained from the rotation of a rotor as an envelope signal which results from simultaneously detecting information of slits formed on the whole circumferences of the rotor and the stator.

It is another object of the present invention to provide an inexpensive tape speed sensor in which a manufacturing cost can be suppressed without considering a finished accuracy and an assembly accuracy of each assembly of a tape speed sensor from a structure standpoint.

It is a further object of the present invention to provide a control circuit for a tape speed sensor in which an error component contained in a rotary encoder itself can be eliminated electrically.

It is yet a further object of the present invention to provide a tape speed sensor in which wow and flatter can be theoretically eliminated from reproduced data by modulating the reproduced data by an error signal detected from a tape speed sensor and a control method using such control circuit.

According to the present invention, in a tape speed sensor including a rotor whose outer circumferential surface contacts with a running tape and which has a translucent cylindrical portion, a supporting member for pivotally supporting this rotor, a light-emitting element for introducing light into the rotor, slits formed around both of an end face of the rotor and the supporting member opposed to this end face along a circumference direction at a predetermined pitch and a light-receiving element for a rotation speed detection for receiving light passed through the rotor and passed through the slits, the tape speed sensor is characterized in that partial pass bands for partly passing light emitted from the light-emitting element to the outside from the outer peripheral surface of the rotor or non-pass bands for partly shielding light passed to the outside from the outer peripheral surface of the rotor are formed on the rotor and a second light-receiving element for rotation phase detection for detecting light passed through the pass bands or the shielding of light by the non-pass bands is provided on the outer peripheral portion of the rotor.

There is further provided a reflection portion for reflecting light irradiated from the light-emitting element radially from the rotation center side of the rotor and wherein a reflection surface for reflecting radially reflected light in the direction of the slits from the cylindrical portion is formed on the rotor in a peripheral fashion, a part of the peripheral reflection surface formed on the rotor is made as a non-reflection shape and the non-reflection shape portion is formed as the pass band.

There is further provided a reflection portion for radially reflecting light irradiated from the light-emitting element from the rotation center side of the rotor to the cylindrical portion of the rotor and wherein a reflection surface for reflecting the radially reflected light from the cylindrical portion to the slit direction and which passes a part of light is formed on the rotor in a peripheral fashion, a shielding portion for partly shielding light passed through the peripheral reflection surface and which is emitted to the outer peripheral direction is formed on the rotor, and this shielding portion is formed as the non-pass band.

A control circuit using a tape speed sensor comprises a motor servo system for controlling a rotation of a tape by feeding back an output from the tape speed sensor, a PLL loop for generating a control clock from the output from the tape speed sensor, a signal delay unit for delaying a reproduced signal from a head, an A/D converter for A/D-converting a head output signal from the signal delay unit by using the control clock, a memory controller for controlling the A/D-converted digital signal, a memory for storing the digital signal, a D/A converter for reconverting the digital signal into an analog signal by the memory controller and a reference clock for controlling the memory controller and said D/A converter.

Preferably, in a control method using a tape speed sensor according to the present invention, a control circuit comprises means for calculating a rotation cycle of a tape speed sensor based on a trigger signal detected by a light-receiving element for rotation phase detection and means for extracting an error signal implicated in the tape speed sensor from a source signal detected by a light-receiving element for rotation speed detection based on this rotation frequency, wherein an error signal is erased from the source signal by time-base-modulating the source signal while the source signal is synchronized with an opposite phase of the error signal.

This method may comprise the steps of converting individual error signals relative to a reference wave of a tape speed sensor into data and store the data in ROM and erasing an error signal from a source signal outputted from the tape speed sensor by time-base-modulating an opposite phase wave of the data based on a time base of a trigger signal outputted from a light-receiving element for rotation phase detection.

Preferably, error component data stored in ROM is representing data or approximate data obtained at every production lot of a tape speed sensor.

Further, according to the present invention, a tape speed sensor control circuit comprises a tape speed sensor, a motor servo system for controlling a rotation of a tape by feeding back an output from the tape speed sensor, a PLL loop for generating a control clock from the output from the tape speed sensor, a signal delay unit for delaying a head reproduced signal, an A/D converter for A/D-converting the head output signal from the signal delay unit by using the control clock, a memory controller for controlling this A/D-converted digital signal, a memory for storing the digital signal, a D/A converter for reconverting the digital signal into an analog signal by the memory controller and a reference clock for controlling the memory controller and the D/A converter, wherein the control clock is generated from the PLL loop after an output signal from the tape speed sensor was multiplied.

Preferably, a control clock generated in the PLL loop is time-base-modulated in response to the change of tape speed and when a head reproduced signal is reconverted into an analog signal by a reference clock after the head reproduced signal was A/D-converted by the control clock, the A/D-converted reproduced signal is time-base-modulated in accordance with an error component generated when a tape is transported.

In a tape speed sensor (TSS) according to the present invention, slits are formed around the opposing surfaces of a rotor and a stator (supporting members), light from a light-emitting element is passed through the slits and received by a first light-receiving element for a rotation speed detection and thereby an envelope signal is detected. On the other hand, pass bands are formed on the end face of the rotor, and a second light-receiving element for a phase detection is located at the position opposing the pass band. This light-receiving element receives light passing through the pass bands each time the rotor is rotated and obtains a trigger signal by converting the same into an electrical signal. In this case, when the peripheral reflection surface is formed, a part of the pass band is shaped as a convex (see FIG. 4A) or a part of the reflection surface is shaped as a cutaway in a diameter direction (see FIG. 5A). That is, light leaked from the inside of the rotor to the outside is received Alternatively, a part of light is reflected on the reflection surface formed on the rotor into the cylindrical portion of the rotor as light controlled for FG and other light is scattered light free from the control (uncontrollable). Assuming that such light is constantly passed to the outside, a non-passing portion is formed by shielding a part of the passed light, and a PG output is obtained by detecting the shielding portion with the second light-receiving portion.

Also, in the TSS signal obtained from the tape speed sensor, the error component due to the eccentricity or the like implicated in the tape speed sensor (TSS) itself may be eliminated by a signal control circuit (TBC circuit) of a reproducing system of a capstan-less tape reproducing apparatus shown in FIG. 10, for example. That is, since the quality or reliability of the TSS signal may be improved, a reproducibility of a head reproduced signal processed by the TBC circuit may be improved.

Since the error component of the TSS may be eliminated electrically, the tape speed sensor of the present invention may be used in a low-cost TSS in which an assembly accuracy of TSS itself, for example, is lowered. Thus, as compared with a conventional expensive control system such as a motor servo or the like formed of only the mechanical system in which wow and flatter cannot be erased completely, even though the mechanical control ability is lowered in accordance with the reduction of the cost, it is possible to completely eliminate the wow and flatter caused by the mechanical factor from the reproduced signal finally by correcting the reproduced data by the TSS in a digital fashion.

Also, the control of the motor may be such one that controls the rotation of the motor by inputting a control signal outputted from a memory controller into the motor controller. Since the control signal of the memory controller is generated by a quartz oscillator or the like, for example, such control signal may be increased high in accuracy, and a control accuracy of a servo system can be improved. Thus, the accuracy of the tape speed can be further improved, and the reduction of the wow and flatter becomes possible. Furthermore, depending on the processing capability of the DSP (digital signal processor), it is possible to eliminate the wow and flatter to zero from a theory standpoint.

Further, although each control clock generated by the PLL loop is time-base-modulated based on the error component detected by the TSS, it is preferable that each of these control clocks may constantly follow the TSS signal outputted from the TSS with a high fidelity. The higher this fidelity becomes the more the reproduction accuracy may be improved. Accordingly, by increasing the detection frequency of the TSS signal itself, it is possible to improve a follow-up property of each control clock. Thus, when the detection frequency of the TSS signal is limited (about 1 kHz) depending upon a tape speed and a size of TSS, if the TSS signal is multiplied when the TSS signal is converted by the signal shaping unit into the pulse signal and the detection frequency of the TSS signal itself is improved substantially, it becomes possible to improve a reproduction accuracy in the TSS.

BRIEF DESCRIPTION OF THE DRAWINGS

FIGS. 8A, 8B and 8C are schematic waveform diagrams showing an envelope signal, a trigger signal and a synthesized signal (TSS signal) of FIGS. 8A, 8B, respectively;

FIGS. 12A, 12B, 12C and 12D are diagrams showing a waveform shaping for generating a pulse signal from a TSS signal wherein FIG. 12A is a diagram showing a waveform shaping of a TSS signal, FIG. 12B is a diagram showing a waveform shaping done by an ordinary method, FIG. 12C is a diagram showing a waveform shaping done by a multiplication, and FIG. 12D is a diagram showing a waveform shaping done by a pseudo-like multiplication method.

DETAILED DESCRIPTION OF THE PREFERRED EMBODIMENTS

The present invention will hereinafter be described with reference to the drawings.

Figure 1:
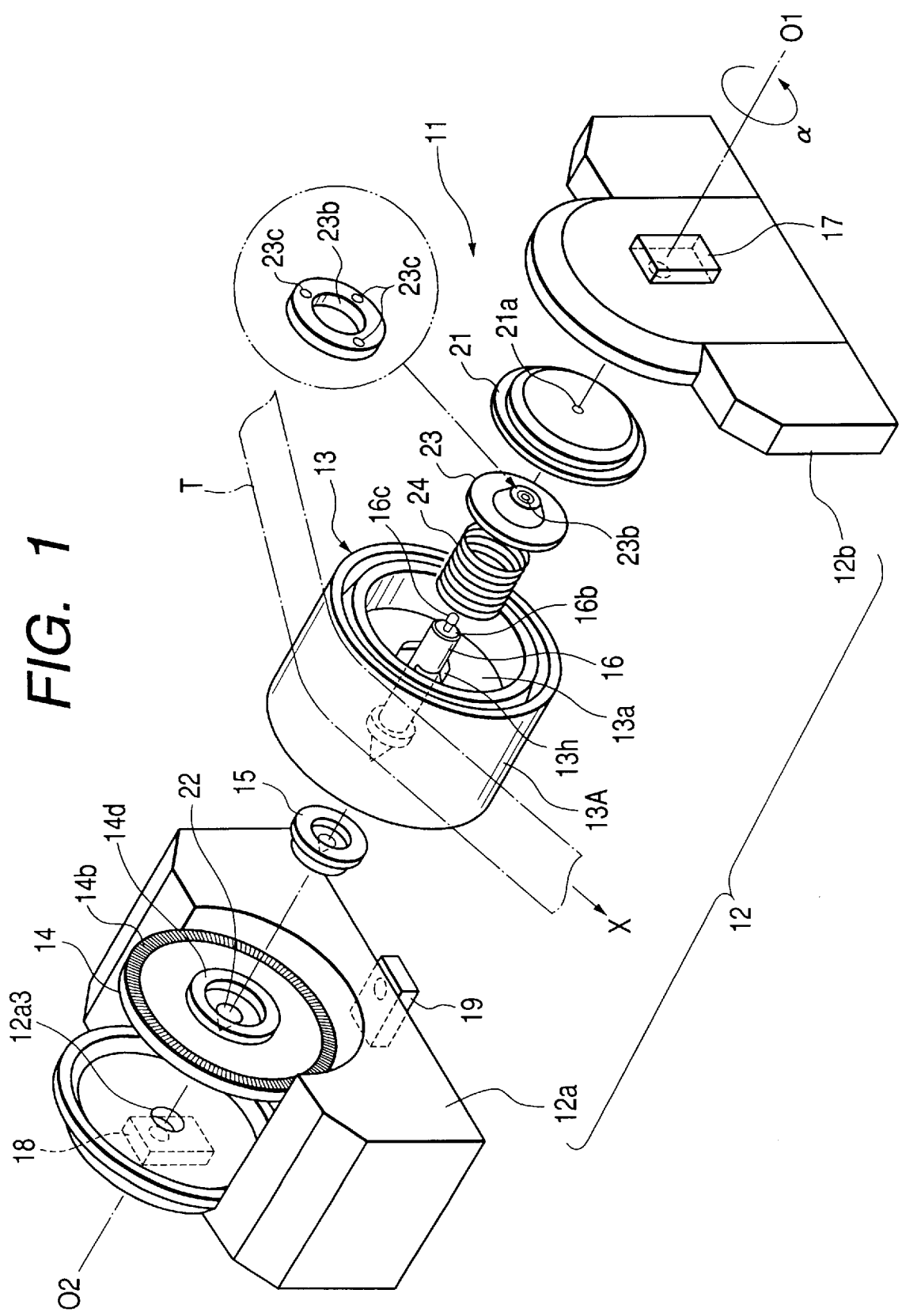
FIG. 1 is an exploded perspective view of a tape speed sensor (TSS) according to the present invention.
Figure 2:
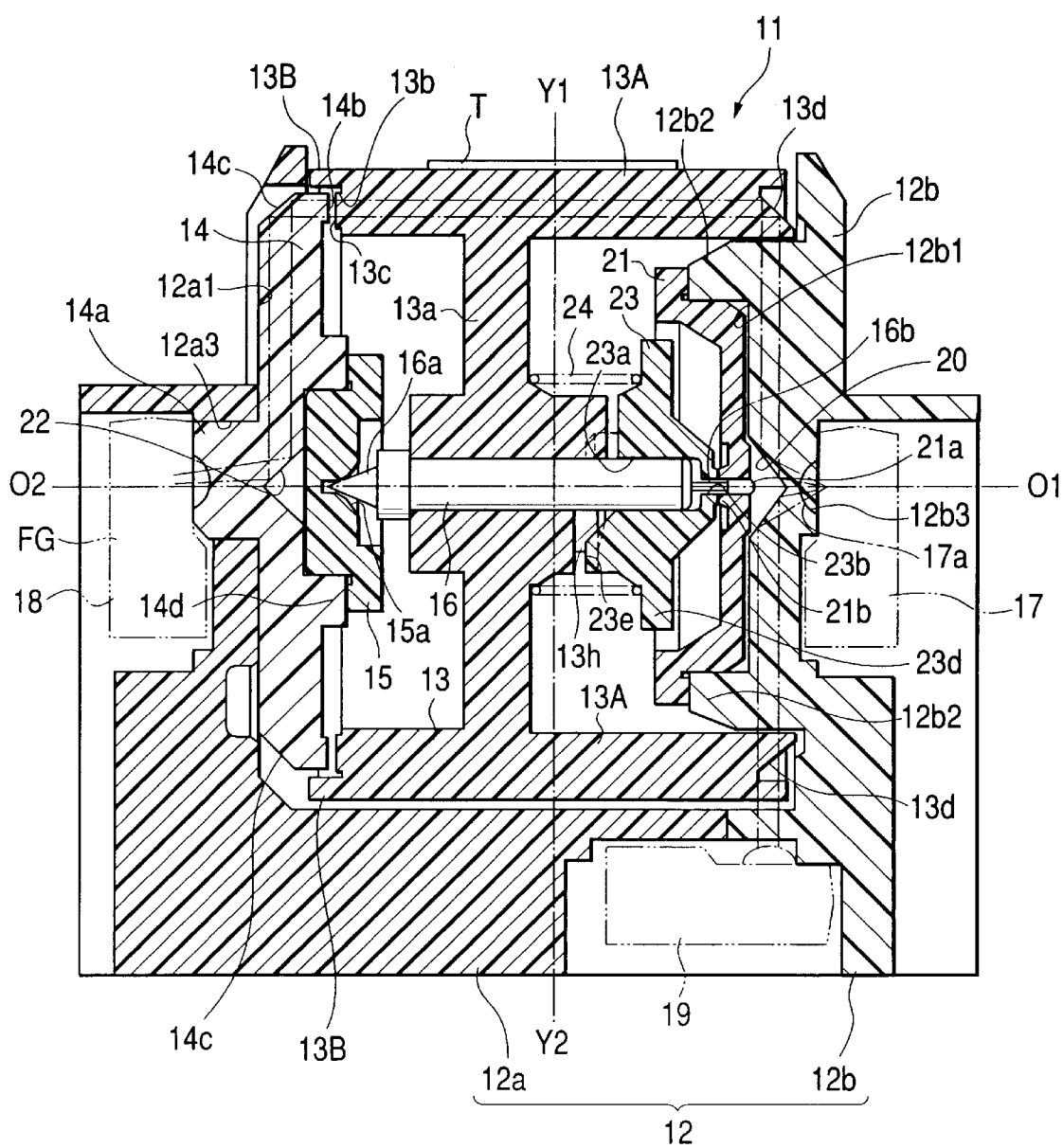
FIG. 2 is a cross-sectional view in the axis O of FIG. 1.

FIG. 1 is an exploded perspective view of an optical tape speed sensor (TSS) according to the present invention, and FIG. 2 is a cross-sectional view taken along the line O1 to O2 in FIG. 1.

The optical tape speed sensor (hereinafter simply referred to as "TSS (tape speed sensor)") according to the present invention is used as a sensor for detecting a tape running speed or wow and flatter of a cassette tape recorder, a DAT (digital audio tape recorder) or a data recorder used as a backup of a hard disk device of a computer.

In a TSS 11 shown in FIGS. 1 and 2, a rotor 13 and a stator 14 are housed in a supporting member 12 comprising a holding member. The rotor 13 and the stator 14 are both made of a translucent member, e.g. a transparent material such as an acrylic resin. The supporting member 12 comprises a first supporting member 12a and a second supporting member 12b of the right-hand side. The second supporting member 12b is made of a translucent member. Then, this rotor 13 is held between the first supporting member 12a and the second supporting member 12b.

The rotor 13 includes a cylinder portion 13A of a cylindrical configuration in which a rotary shaft 16 is unitarily formed. The rotor is pivotally supported by a stator bearing member 15 and a bearing member 21 housed within the supporting member 12. Incidentally, the rotary shaft 16 of the rotor 13 is set to be coaxial with an axis O (O1–O2).

As shown on the right-hand side of FIG. 2, a light-emitting element 17 comprised of a light-emitting diode (LED) or the like is embedded into the inside of the second supporting member 12b. Light from this light-emitting element 17 is emitted in the O2 direction. A first reflection curved surface 20 having a trumpet-shaped cross-section opened in the O2 direction is formed at the central portion of the inner wall of the second supporting member 12b. The deepest portion of the first reflection curved surface 20 is narrowed most, and the curved surface is progressively opened from the deepest portion to the open end. The curved surface is formed of a large parabolic surface or an arcuate surface having a large curvature. In this first reflection curved surface 20, diffused light emitted from the light-emitting element 17 is converted into a bundle of light parallel to the direction perpendicular to the axis O, diffused in the direction of 360 degrees, and then reflected. Since the cross-section of the reflection curved surface 20 is parabolic or arcuate, light emitted from the light source can be utilized effectively, and introduced into the reflection surface of the rotor 13.

A bearing member 21 of substantially crown-like configuration is secured to an inner wall surface 12b 1 of the second supporting member 12b including this first reflection curved surface 20. Then, the bearing member 21 has at its central portion defined a bearing hole 21a into which a narrow shaft 16b formed at the right-hand end of the rotary shaft 16 of the rotor 13, which will be described later on, is inserted. The center of the bearing hole 21a and the deepest portion (narrowest portion) of the first reflection curved surface 20 are both located on the axis O.

A stator (forming a part of the supporting member) of a pot-lid-like cross-section is fixed to an inner wall surface 12a 1 of the first supporting member 12a. A central convex portion 14a protruded in the O2 direction in the sheet of drawing is embedded in a supporting through-hole 12a 3 defined in the first supporting member 12a. A reflection surface 14c which is inclined over the whole circumference is formed around the outer edge of the stator 14. A first light-receiving element 18 formed of a photodiode (PD) or the like is formed on the end face of the convex portion 14a. This first light-receiving element 18 is a rotation speed detector (hereinafter referred to as FG (frequency generator) 18), and is able to receive light emitted from the light-emitting element 17. On the center of the right-hand end in the sheet of drawing is formed a second reflection curved surface 22 which is cut away in a trumpet-like cross section similarly as described above.

A holding portion 14d is formed on the right-hand end face of the stator 14 including this second reflection curved surface 22. The stator bearing member 15 is engaged into this holding portion 14d. As illustrated, on the right-hand end face of this stator bearing member 15 is formed a bearing portion 15a of a trumpet-like configuration. As illustrated, a tip end portion 16a at the left-hand end of the rotary shaft 16 of the rotor 13 is formed as a cone (sharp shape), inserted into and pivoted in the cylindrical portion of the bearing portion 15a of trumpet-like shape.

Also, the right-hand end of the rotary shaft 16 is narrowed extremely with respect to the diameter of the rotary shaft 16, and a bearing portion 16c is formed on the tip end of the rotary shaft. A portion between the rotary shaft 16 and the bearing portion 16c is further narrowed as a narrow bearing portion 16b. This rotary shaft 16 is inserted into a holding hole 23a defined in a spring bearing portion 23. Also, since the narrow bearing portion 16b is loosely fitted into an insertion aperture 23b, the rotary shaft 16 is not guided by the holding hole 23a but slidably guided only by the holding hole 23a in the axis O direction. Thus, the double guiding operations done by the holding hole 23a and the insertion aperture 23b are avoided, and hence the holding hole and the insertion aperture can be prevented from interfering upon rotation. Also, the bearing portion 16c is inserted through the insertion aperture 23b defined at the center of the spring bearing member 23 and supported to a bearing through-hole 21a defined in the bearing portion 16c. The positioning of the rotor with respect to the diameter direction is executed by this bearing portion 16c and the bearing hole 21a. That is, the rotor 13 is pivoted by the tip end portion 16a of the rotary shaft 16 inserted into the cylindrical portion 15b of the bearing portion 15a formed on the bearing member 15 of the left-hand end of the sheet of drawing and the bearing portion 16c inserted into the bearing hole 21a defined in the bearing member 21 of the right-hand end. Thus, the cylindrical portion 15b and the bearing hole 21a are positioned at the center of the axis O, whereby the rotary shaft 16 can agree with the axis O.

The surrounding portion of the insertion aperture 23b of the right-hand end face of this spring bearing member 23 is protruded a little in the O1 direction as shown in FIG. 4. There is formed a protruded portion 23c of substantially hemisphere shape which contacts with the bearing member 21 at three points, for example. The surrounding portion of the bearing hole 21a opposing the spring bearing member 23 is formed as an annular protruded portion 21b protruded a little in the O2 direction. A vertex of the protruded portion 23c contacts with the annular protruded portion 21b. When the rotor is rotated, the vertex of the protruded portion 23c is slid over the annular protruded portion 21b.

On the other hand, on the left-hand end (O2) side of the spring bearing member 23, a hook portion 23e having three grooves is formed around the holding hole 23a, for example. On the other hand, a hook portion 13h having three grooves which is meshed with this hook portion 23e is formed around the rotor 13 side (see FIG. 1 or 2). When the rotor 13 is rotated, the hook portions 13h and 23e contact with each other, thereby making it possible to unitarily rotate the rotor 13 and the spring bearing member 23 as one body.

Figure 3A:
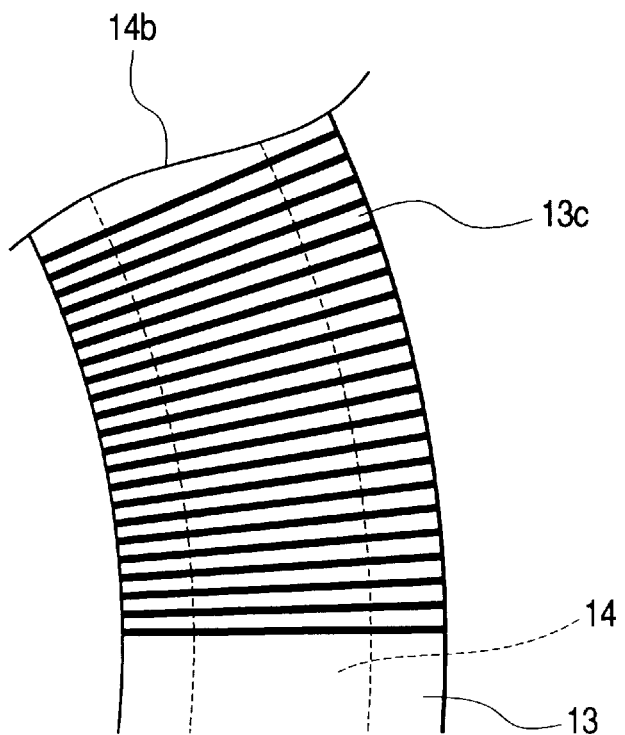
FIG. 3A a plan view showing the manner in which pass areas (interrupt areas) of slits are overlapping with each other.
Figure 3B:
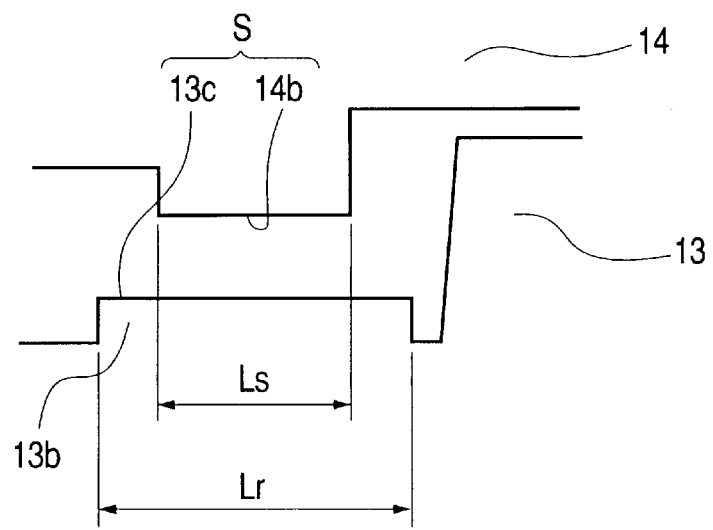
FIG. 3B is a cross-sectional view thereof.
Figure 4A:
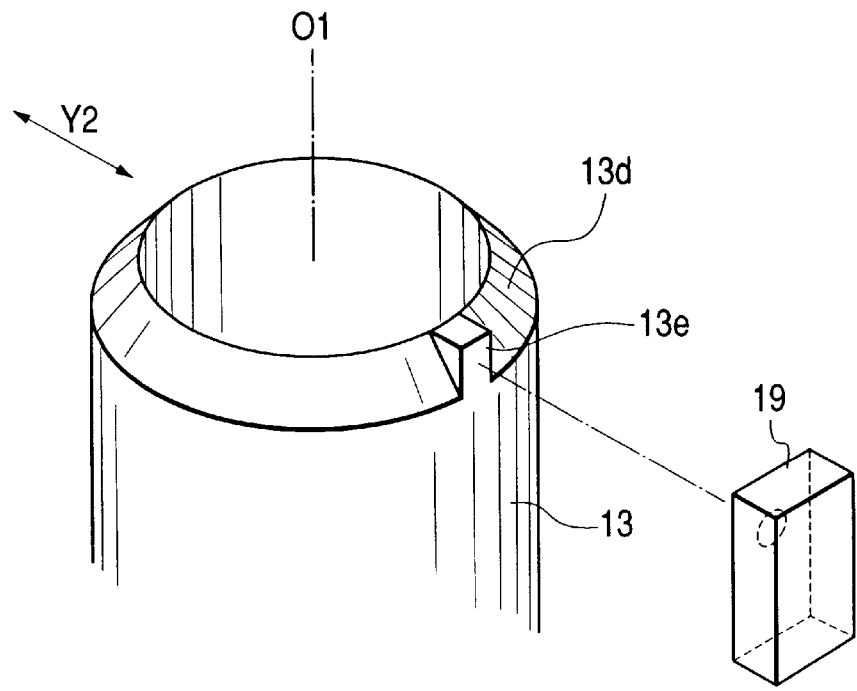
FIG. 4A is a perspective view showing an end face of a rotor according to the present invention.
Figure 4B:
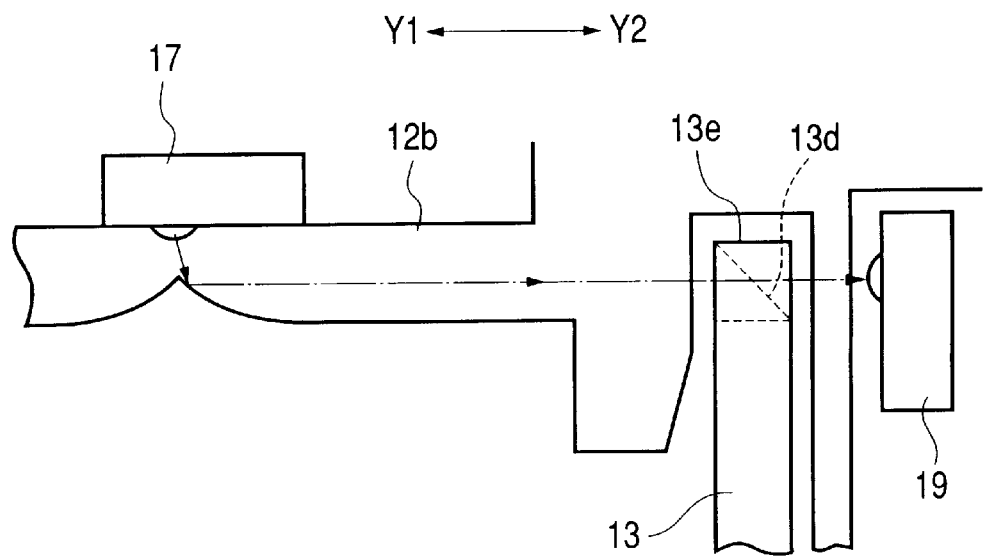
FIG. 4B is a cross-sectional view thereof.
Figure 5A:
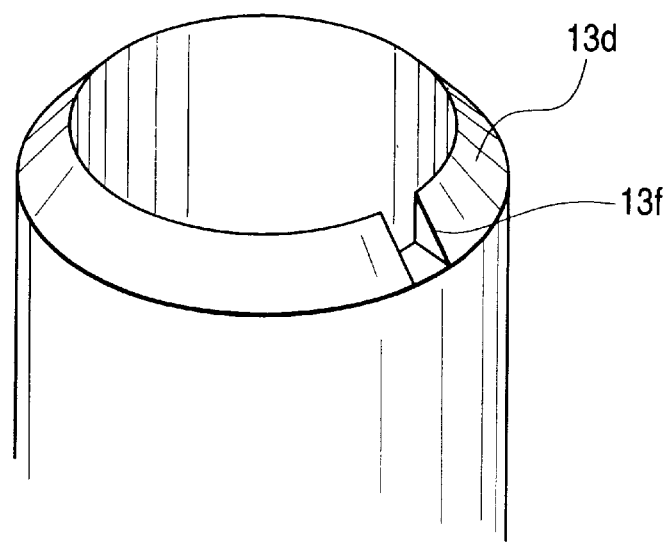
FIG. 5A is a perspective view showing an end face of other rotor according to the present invention.
Figure 5B:
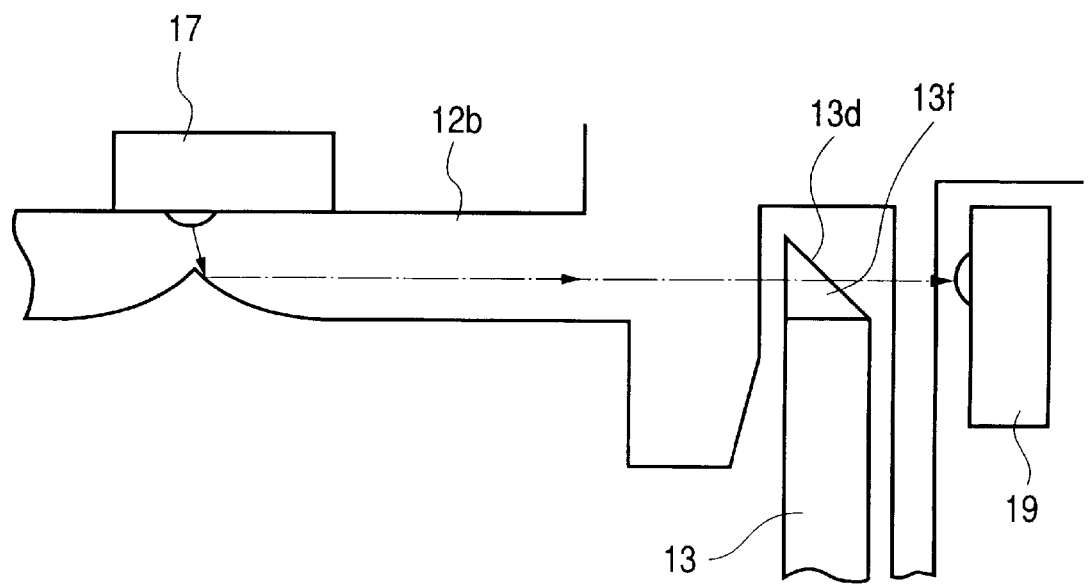
FIG. 5B is a cross-sectional view thereof.
Figure 6:
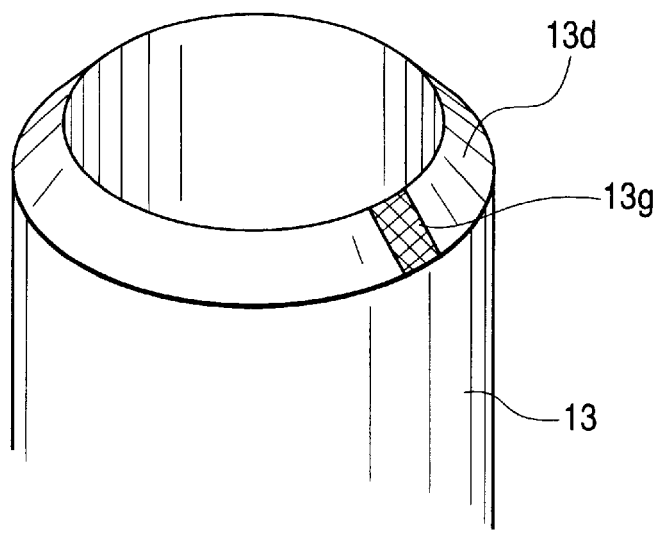
FIG. 6 is a perspective view showing the manner in which non-pass bands are formed on the reflection surface of the rotor.
Figure 7:
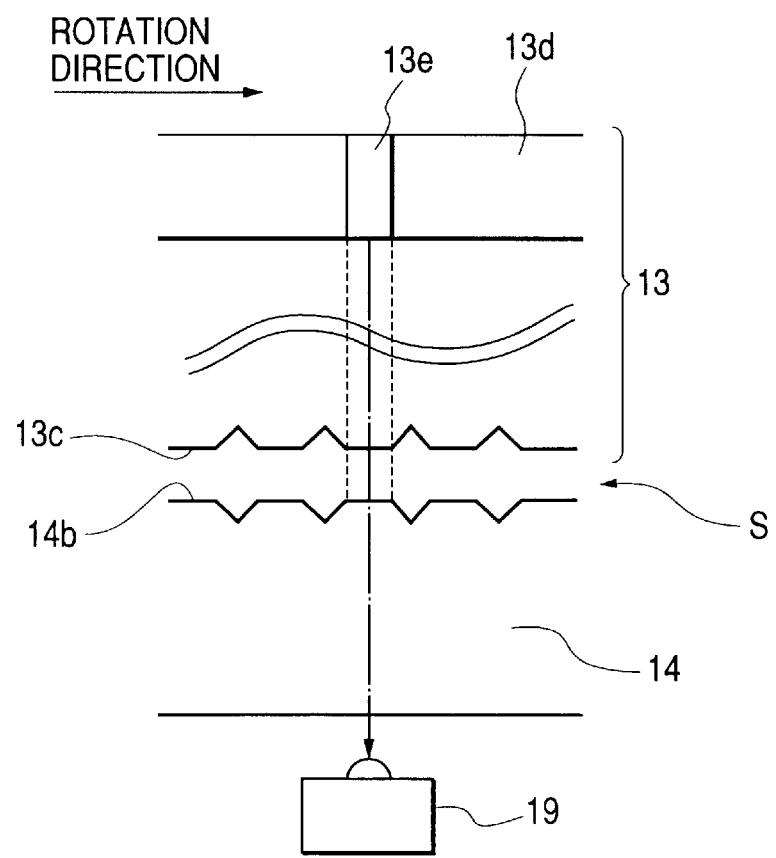
FIG. 7 is an enlarged view of a side surface of a rotor and illustrates pass bands and slits.

FIGS. 3A and 3B show a slit portion. FIG. 3A is a plan view illustrating the state that passing areas (interruption areas) overlap with each other. FIG. 3B is a cross-sectional view thereof. FIGS. 4A and 4B show the right-hand end face of the rotor. FIG. 4A is a perspective view showing the shape of the passing band. FIG. 4B is a cross-sectional view thereof. FIG. 5A is a perspective view showing the shape of other rotor of FIGS. 4A and 4B. FIG. 5B is a cross-sectional view thereof. FIG. 6 is a perspective view showing the shape in which a non-passing band is formed on the reflection surface of the rotor. FIG. 7 is an enlarged view of the side surface of the rotor showing the passing bands and slits.

As shown in FIG. 3B, there is formed a slit portion S between the rotor 13 and the stator 14. Slits 14b in which pass areas and interrupt areas having concave and convex cross-sections are alternately arranged in a bar code fashion are formed around the edge portion of the inner wall of the stator 14 at a predetermined pitch. Incidentally, the slit portion S may be comprised of mirror-finished forming portion and disturbance portions (e.g. vertical cross-stripes or horizontal cross-stripes formed of plain ground or V-shaped concave and convex surfaces or laid very small triangular pyramids or quadrangular cones (pyramids)) on the mirror-finished surface of the rotor or stator.

When the pass areas and the interrupt areas are formed at the angular distance of 0.5°, the slit includes 360 pass areas and interrupt areas. Slits 13c are formed on the end face 13b of the cylindrical portion 13A of the rotor 13 opposing the slits 14b similarly to the stator 14. In order to increase the number of detection pulses per revolution of the rotor 13 as much as possible to increase a utilization ratio thereby to absorb pattern errors of slits formed over the whole circumference, the number of the slits on the rotor 13 and the stator 14 is made the same. The reason that there are provided 360 slits is that it is preferable that there are provided slit as much as possible in order to cope with a frequency of a servo control system, which will be described later on, and to increase a detection accuracy and that a limit from a standpoint of a work process and a mass-productivity are taken into consideration when slits are manufactured. The above-mentioned reason is that a balance among the output generated when the rotor is rotated relative to the tape speed, a frequency (1 kHz) of the servo system and the work processing is taken into consideration.

However, as shown in FIGS. 3A, 3B, when the rotor 13 and the stator 14 are overlapped with each other, the length Lr of the radius direction of the slits of the rotor 13 is formed wider (Ls<Lr) as compared with a length Ls of the radius direction of the slits of the stator 14. Thus, even when an eccentricity occurs in the rotation of the rotor 13, for example, if such eccentricity falls within a tolerance, then it is possible to main the overlapping state between the slits 13c of the rotor 13 and the slits 14b of the stator after the eccentricity occurred. Therefore, since an amount of light passed through the stator 14 side may always be maintained constant, it is possible to stabilize the level of the signal outputted from the FG 18.

On the other hand, on the right end face of the cylindrical portion 13A of the rotor 13, a translucent portion is formed by annularly forming the reflection surface 13d cutaway with an inclination as shown in FIG. 4A, for example. Then, on a part of the reflection surface 13d, there is formed a pass band 13e of a convex shape which is not cutaway. As shown in FIGS. 1, 2 and FIGS. 4A, 4B, there is provided a rotation phase detector (hereinafter referred to as a PG (pulse generator) 19) comprising a second light-receiving element 19 in the Y2 direction. When the rotor 13 is rotated in the inside of the supporting member 12, the pass band 13e and the PG 19 may be opposed to each other once per revolution.

An operation of the thus arranged TSS will be described.

In this TSS, the rotor 13 is rotated while the outer circumferential surface of the rotor 13 is urged against a recording tape Ta as shown in FIG. 1 or 2. When the recording tape Ta is transported in the arrow X direction, a frictional resistance is generated by a tension caused in the tape Ta by a transport force between the outer circumference surface of the rotor 13 and the contact surface of the tape Ta. Thus, a relative speed at a contact point between the rotor 13 and the tape Ta is kept zero and a transport force of the tape Ta is reliably converted into a rotation force of the rotor 13, thereby rotating the rotor 14 in the α direction.

As shown in FIG. 2, on the second supporting member 12b side, light emitted from the light-emitting element 17 is introduced into the supporting member 12b and diffused by the first reflection curved surface 20 formed within the supporting member 12b in the direction of 360 degrees perpendicular to the axis O, i.e. the radiation direction in the direction of the reflection surface 13d (translucent portion) annularly formed around the right-hand end face of the rotor 13. As described above, since the first reflection curved surface 20 is formed of the parabolic surface or the arcuate curved surface having the large curvature, much more diffused light can be introduced in the direction of the reflection surface 13d. Thus, since the influence of the positional displacement of the light-emitting element may be absorbed, it becomes possible to increase a utilization ratio of the light-emitting element 17.

Light reflected on the first reflection curved surface 20 is traveled through the second supporting member 12b formed from the translucent member, introduced into the inner wall of the rotor 13 from the direction perpendicular to the axis O (direction away from the axis O), and supplied to the reflection surface 13d formed around the rotor 13. On the reflection surface 13d of the rotor 13, this light is reflected and introduced into the inside of the cylindrical portion 13A within the rotor 13. At that time, light is reflected in the direction parallel to the axis O, traveled through the cylindrical portion 13A in the O2 direction or reflected and introduced, thereby being passed through the slits 13c formed on the left end face of the rotor 13. Then, although the light is once emitted to the outside from the left end face of the rotor 13 with the slits 13c formed thereon, the light is introduced into the inside of the stator 15 through the slits 14b opposing the left end face of the rotor 13.

Further, the light is converged in the axis O direction by the reflection surface 14c formed on the stator 14, and reflected on the second reflection surface formed on the first supporting member 12a. At that time, since the second reflection curved surface also is formed as a trumpet-like shape, the light-receiving portion of the FG 18 receives focused light which is less affected by the positional displacement of the light-receiving element itself.

As described above, the reflection surface 13d of the rotor 13 is formed at an angle of approximately 45 degrees relative to the axis O in such a fashion that light reflected on the first reflection curved surface may proceed through the inside of the rotor 13 in the direction parallel to the axis O. Although diffused light from the center is reflected into the cylindrical portion 13A by this reflection surface 13d, in the pass bands 13e formed on a part of the outer periphery of the rotor 13, light radially reflected by the first reflection curved surface 20 is traveled in the outer peripheral direction as it is, and emitted to the outside (Y2 direction) of the cylindrical portion 13A (see FIG. 4B). Thus, the PG 19 receives light only when the pass band 13e and the PG 19 are opposed to each other so that the PG 19 outputs a signal of one pulse each time the rotor 13 rotates. This PG signal will hereinafter be described as a trigger pulse signal St (hereinafter referred to as a trigger signal St).

In the above description, the shape of the cylindrical portion 13A may be such one shown in FIG. 5A, for example. In FIG. 5A, the reflection surface 13d having an inclined cutaway is formed around the right end face of the cylindrical portion 13A similarly to FIG. 4A. A part of this reflection surface 13d is cut out to form the pass band 13f. As shown in FIG. 5B, when the rotor 13 with such pass band 13f formed thereon is rotated, the PG 19 is able to receive light only when the pass band 13d and the PG 19 are opposed to each other, and may output the trigger signal St similarly as described above. Incidentally, the envelope signal Se and the trigger signal St are respectively shown by waveforms in FIGS. 8A and 8B, for example, which will be described later on.

Also, when an inexpensive surface light-emitting diffusion light source is used as the light-emitting element 17, there always exists light which is not reflected into the cylindrical portion 13A of the rotor 13 but which is leaked through the reflection surface 13d to the outside direction of the rotor 13. In this case, since the PG 19 is constantly placed in the light-receiving state, it is placed in the state that a Hi level signal is electrically outputted (hereinafter simply referred to as H level). Therefore, as shown in FIG. 6, when a part of the reflection surface of the rotor 13 is formed as a non-pass band 13g which prohibits light from passing therethrough, this non-pass band 13g and the PG 19 may be opposed to each other during the rotor 13 rotates once. Thus, when the non-pass band 13g and the PG 19 are opposed to each other, the PG 19 becomes unable to detect light leaked from the rotor 13 so that the output signal, which is generally held at H level, from the PG 19 can be instantly set to Low level (hereinafter simply referred to as L level) electrically. Thus, this L level signal can be used as the PG signal, i.e. trigger signal St.

In this case, the non-pass band 13g can be formed of a ground band, for example. Also, the non-pass band may be formed of a colored band such as black or silver, vertical cross-stripe or horizontal cross-stripes formed of semicircular or V-shaped concave or convex surfaces or very small triangular pyramids or quadrangular cones (pyramids) laid thereon.

Also, only light passed through the pass areas of the slits 13c formed around the left end face of the above-mentioned rotor 13 is emitted and introduced through the pass areas of the slits 14b formed around the stator 14 of the left-hand end side. Only the slits 13c on the rotor 13 side are rotated, and the slits 14b on the supporting body side are made stationary. Thus, when the rotor 13 is rotated, the pass areas (interrupt areas) overlap with each other (see FIG. 5A) and the pass areas and the interrupt areas overlap with each other alternately. The instant the pass areas (interrupt areas) of the slits overlap with each other as shown in FIG. 5A during the rotor 13 rotates, light is introduced from the rotor 13 through each pass area to the supporting member 12a so that the detected light amount in the FG 18 becomes maximum. On the other hand, the instant the pass area and the interrupt area completely overlap with each other, all areas become interrupt areas so that it is refracted and introduced (scattered light) to the extent that it may not be converged to the light-receiving portion. As a result, the detected light amount in the FG 18 becomes minimum due to a light interrupt effect to the light-receiving portion. A light detection signal thus detected from the FG 18 becomes an envelope signal (envelope) An instantaneous frequency of this signal is proportional to an instantaneous angular velocity of the rotor 13. Accordingly, it is possible to detect a rotation speed by electrically processing a signal from the FG 18.

As described above, when the slits are comprised of 360 pass areas and interrupt areas, the number of pulses comprising one cycle of the envelope signal is 360. The envelope signal Se thus detected herein integrally shows information indicating that light is passed or not passed over the whole circumference of the slits 13c or 14b of the slit portion S. In addition, this information is focused and detected by one FG 18 one at a time. Thus, the level of the output signal can be increased as compared with the prior-art technology, and the output signal can be made difficult to be affected by a noise, thereby making it possible to increase a detection accuracy. Furthermore, since accuracy of assemblies and error of assembly process can be absorbed to some extent as compared with the conventional encoder, a detection accuracy may be improved while a work property of assemblies and an assembly property may be increased.

When light passed through the cylindrical portion 13A of the rotor 13, for example, and which is detected by the FG 18 and light passed through the pass bands 13e or 13f and which is detected by the PG 19 are optically synthesized and then detected by the FG 18 later on, there may be obtained a synthesized output signal shown in FIG. 8C. Incidentally, FIG. 8A is a waveform diagram showing the envelope signal detected by the FG, FIG. 8B is a waveform diagram showing a trigger signal, and FIG. 8C is a schematic waveform diagram showing a synthesized signal (TSS signal) of FIGS. 8A and 8B, respectively.

In this case, light may be reflected and introduced at the inside of the supporting member or the outside of the supporting member instead of the PG 19, whereby light may be introduced into the stator one more time. The signal shown in FIG. 8C is similar to a synthesized signal (hereinafter referred to as TSS signal) which results from superimposing the trigger signal St shown in FIG. 8B on the envelope signal Se shown in FIG. 8A. In this TSS signal, since the trigger signal St is protrusively generated from the envelope signal Se at a constant time interval, a cycle t of the envelope signal Se may be detected. When rays of light are synthesized before light is detected by the FG 18 as described above, the light-receiving element (PG 17) for detecting a trigger signal becomes unnecessary, thereby making it possible for only the FG 18 to detect the trigger signal. Thus, the number of assemblies may be reduced and a manufacturing cost may be reduced.

From a theory standpoint, if the positions and widths of the circumference direction of the slits 13c, for example, and the pass bands 13e are made the same as shown in FIG. 7, the trigger signal may be outputted when the pass band 13e is opposed to the PG 19. Then, in this case, the trigger signal St maybe synchronized with the envelope signal Se, and the polarity thereof may constantly agree with the same polarity of the waveform comprising the synchronized envelope signal Se However, due to a poor work accuracy and the inexpensive diffusion light source used as the light-emitting element and the PG 19 of high sensitivity used as the very narrow slits, in actual practice, a signal is covered with noises and becomes difficult to be detected.

Figures 9A, 9B, 9C:
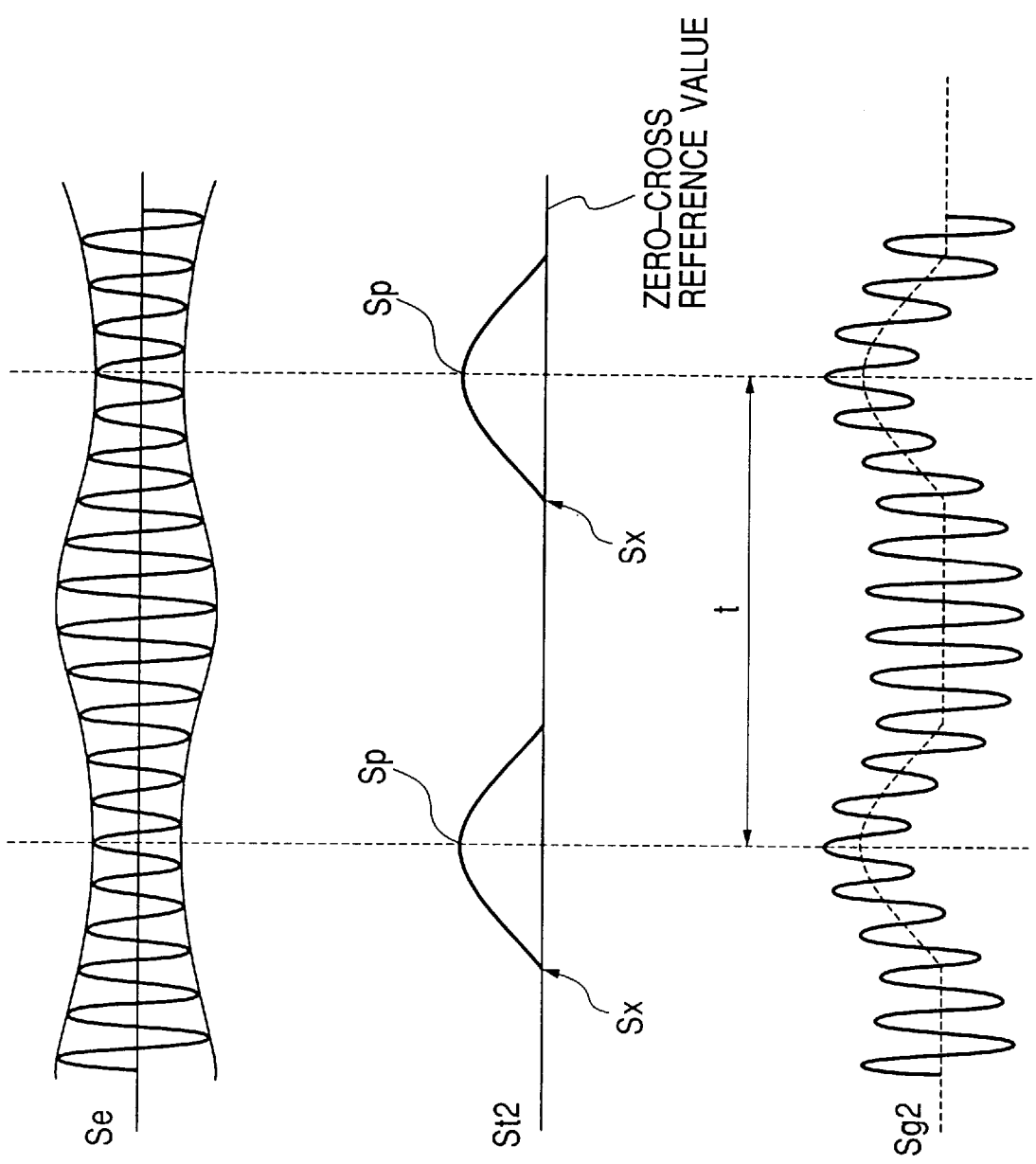
FIGS. 9A, 9B and 9C are respectively schematic waveform diagrams showing an envelope signal, a trigger signal, and a synthesized TSS signal according to the present invention.

Accordingly, if the width of the pass band 13e is formed wider (e.g. corresponding to 10 pulses) than that of the slit 13c as shown in FIG. 9B, for example, it is possible to detect the cycle t. FIG. 9A is a diagram showing an envelope signal detected by the FG, FIG. 9B is a diagram showing a trigger signal, and FIG. 9C is a schematic waveform diagram showing a synthesized signal (TSS signal) of FIGS. 9A and 9B.

As the signal detected by the FG 18, due to a displacement of slit pattern, an inclination generated in the rotor 13 when a tape is urged against the rotor, positional displacements on the light-emitting element and the light-receiving element or the like, there is generally detected an envelope signal shown in FIG. 9A. The trigger signal corresponding to 10 pulses becomes a trigger signal St2 whose time base is extended as shown in FIG. 9B. A TSS signal Sg2 of the signal of FIG. 9A and the signal of FIG. 9B is presented as shown in FIG. 9C. In such TSS signal Sg2, since the trigger signal St2 does not appear remarkably as shown in FIG. 8C, it is difficult to determine the cycle of the envelope signal Therefore, the cycle t of the TSS signal Sg2 may be detected with reference to a maximum peak value Sp obtained in the case of the zero-cross value of the trigger signal St2 or a leading edge SX from the zero-cross reference value.

Incidentally, even when the envelope signal is detected by the non-pass band 13g shown in FIG. 6, it is possible to detect the cycle t similarly.

Also, if the rotor 13 is separated by a Y1–Y2 line shown in FIG. 2, then the TSS may be comprised of a first rotor and a second rotor. The thus separated-type TSS may measure two measured objects, for example, at the same time. When a difference of rotation speeds occurs in the first rotor and the second rotor, it becomes possible to detect a relative speed of the above-mentioned two measured objects. In this case, the measurement accuracy can be increased. Also, when an angular velocity is measured, it becomes possible to detect a phase detection of each rotary body.

An instantaneous frequency of the envelope signal Se detected by the above-mentioned method is proportional to the instantaneous angular velocity of the rotor 13. The TSS signal Sg or Sg2 shown in FIG. 8C or FIG. 9C is processed by the following method and may be used to control the tape running speed of the data recorder or the wow and flatter.

In the above-description, what should be detected by the TSS is mainly a tape running speed and a wow and flatter obtained in the tape travel when the rotor 13 of the TSS is rotated as the tape is transported.

However, when an error occurs in a proper circle degree or the like of the rotor cylindrical portion of the TSS, for example, the TSS itself implicates a finished error. As a result, in the output signal (TSS source signal) of the FG 18, there is outputted the wow and flatter of the tape transport system in which an error signal component of the TSS itself is implicated. In such a case, since the error signal component remains in the end and the wow and flatter cannot be eliminated completely, an accuracy of a capstan-less tape recording/reproducing apparatus cannot be improved.

Figure 10:
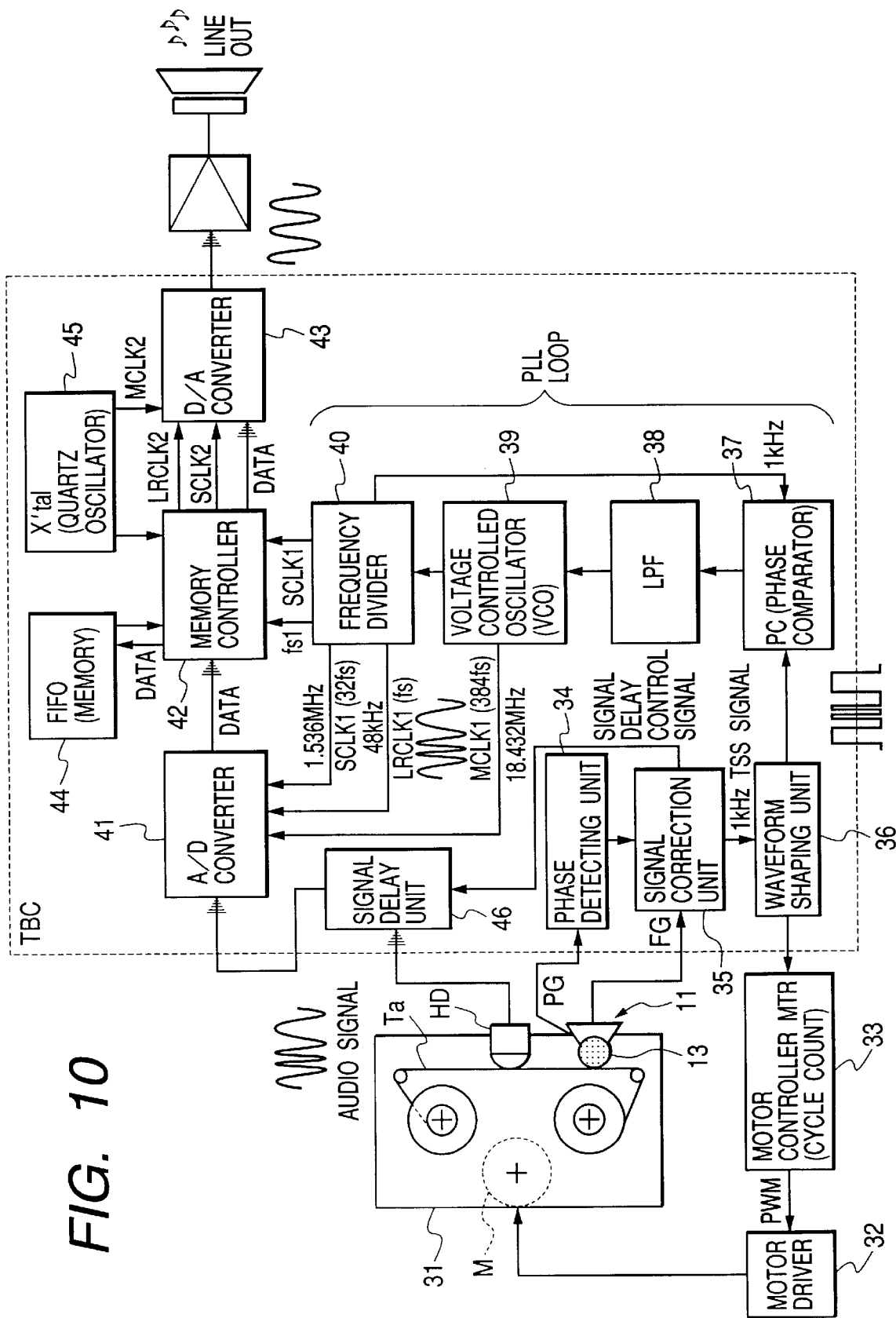
FIG. 10 is a block diagram showing a tape speed control circuit (TBC) of a reproducing system using the TSS according to the present invention.

FIG. 10 shows the manner in which the wow and flatter implicated in the TSS itself can be erased. FIG. 10 is a block diagram showing a tape speed and reproduced signal control circuit (hereinafter referred to as TBC (time base control) circuit) of a reproducing system obtained when the TSS is employed in the capstan-less tape recording/reproducing apparatus.

As shown in FIG. 10, a head HD and the above-mentioned TSS (optical-system tape speed sensor) are brought in contact with a tape Ta with in the cassette 31. When a motor M is driven by a motor driver 32 to transport a tape within the cassette 31, the rotor 13 of the TSS 11 is rotated in response to the travel of the tape Ta. Although the signal of FG 18 is directly inputted from the TSS 11 to a signal correction unit 35, the signal of PG 19 is inputted through a phase detection unit 34 to the signal correction unit 35, whereby the signals of the FG 18 and the PG 19 generate the TSS signal. The signal correction unit 35 is connected to a waveform shaping unit 36 and an output from this waveform shaping unit 36 is connected to a motor controller 33. A rotation servo of the motor M is effected by controlling the motor driver 32 by this signal. The output of the waveform shaping unit 36 is also inputted to a phase comparator (PC) 37 which becomes the final stage of a PLL (phase-locked loop) loop. The PLL loop comprises, in addition to the phase comparator 37, an LPF (low-pass filter) 38, a VCO (voltage-controlled oscillator) 39 and a frequency divider 40 provided at the final stage. One (1 kHz) of the outputs divided by the frequency divider 40 is fed back to the phase comparator 37.

The VCO 39 generates a master clock signal (18.432 MHz, 348 fs) (hereinafter referred to as an MCLK1 signal), and an output therefrom is inputted to the frequency divider 49 and an A/D (analog-to-digital) converter 41. Also, the frequency divider 40 generates an LRCLK1 (48 kHz, fs) and an SCLK1 (1.536 MHz, 32 fs), which are then inputted to the A/D converter 41 and a memory controller 42.

On the other hand, the output of the head HD is connected through a signal delay unit 46 to the A/D converter 41. Incidentally, the signal delay unit 46 is connected with an output of a signal delay control signal (memory OUT timing trigger) by the signal correction unit 35. An output signal (hereinafter referred to as a head reproduced signal) of the head HD and the control clocks such as MCLK1 signal, LRCLK1 and SCLK1 are inputted to the A/D converter 41. Incidentally, the MCLK1 signal is used as a master clock for the operation of the A/D converter 41 itself, LRCLK1 is used as a sampling signal for sampling the head output signal in the A/D converter 41, and the SCLK1 is used as a clock for controlling the data bit length of the head output signal A/D-converted by the A/D converter 41. Since this clock needs a frequency 32 times as high as the sampling signal, its frequency is set to 1.536 MHz. The values of these frequencies are set in order to be used by memory controllers such as an A/D converter, a D/A (digital-to-analog) converter and a DSP.

An output of the A/D converter 41 is inputted to the memory controller 42. This memory controller 42 is connected to an FIFO (First-In-First-Out buffer) (memory) 44 to receive and transmit data therebetween. These data are inputted to the D/A converter 43 provided at the nest stage. The TBC circuit includes a quartz oscillator 45, for example, to generate a reference clock. This oscillation output is inputted to the memory controller 42 and the D/A converter 43. The output from the D/A converter 43 is connected to a LINE OUT, whereby it is emanated from this LINE OUT-PUT as sounds. Alternatively, data is outputted to other computer provided at the outside of the TBC circuit.

A method of controlling the above-mentioned TBC circuit will be described below.

A rotation servo is effected on the motor M which transports the motor, and a tape speed, which will be described later on, is coarsely controlled in such a manner that the output frequency of the TSS 11, for example, becomes 1 kHz. Specifically, when the tape Ta is transported as described above, the rotor 13 of the TSS 11 is rotated so that the envelope signal Se is outputted from the FG 18 of the TSS 11 and the trigger signal St is outputted from the PG 19, respectively. After the phase of the trigger signal has been detected and recognized by the phase detection unit 34, the trigger signal St is inputted to the signal correction unit 35 and the envelope signal Se is directly inputted to the signal correction unit 35. The signal correction unit 35 generates the TSS signal based on the above-mentioned envelope signal Se and the trigger signal St. The error component of the tape transport system and the error component implicated in the TSS itself are erased or separated from the TSS signal. The TSS signal is converted by the waveform shaping unit 36 into a digital signal and inputted to the motor controller 33. The motor controller 33 includes a pulse counter, not shown, to count a predetermined number of pulses thereby to effect a PWM (pulse width modulation) control. This PWM control signal is fed through the motor driver 32 back to the motor M thereby to effect the tape speed control in such a manner that the output frequency of the TSS 11 becomes 1 kHz. Alternatively, the output signal from the memory controller 42 may be inputted to the motor controller 33, thereby resulting in the PWM control being effected. In this case, the standard of the control is the coarse control based on the overflow of the memory.

The TSS signal which is the output from the waveform shaping unit 36 is inputted to the phase comparator (PC) 37 which is the input unit of the PLL loop. The phase comparator 37 compares the phase of the TSS signal (1 kHz) and the phase of the output signal (1 kHz) of the frequency divider 40 to generate a compared voltage corresponding to a difference therebetween. Only a necessary frequency component is extracted by the LPF 38 from this output and supplied to the VCO 39 as a control voltage. At the same time the TSS signal is inputted to the phase comparator 37, the VCO 39 causes the PLl to be placed in the locked state, i.e. oscillates a signal (MCLK1 signal) of a predetermined frequency which is made coincident with the phase of the TSS signal. Then, the output from the VCO 39 is divided by the frequency divider 40 to generate control clocks such as LRCLK1 and SCLK1 These control clocks such as MCLK1 signal, LRCLK1 and SCLK1 are operated to faithfully follow the error component of the output of the TSS signal.

As described above, the head reproduced signal is inputted to a signal delay means 46. This signal delay means 46 comprises a signal delay circuit for a phase recognizing processing and a memory for time-base-matching a head reproduced signal. The signal delay of the phase recognizing processing causes the processing of the phase detection unit to be delayed so that the head reproduced signal is advanced from the output signal from the signal correction unit 35. The head reproduced signal is delayed in order to prevent the head reproduced signal from being advanced and to synchronize the output signal from the signal correction unit and the head reproduced signal with each other. The memory for matching the time base of the head reproduced signal is formed of a memory such as an FIFO memory. The head reproduced signal delayed by the signal delay circuit of the phase recognizing processing is temporarily stored in a memory (FIFO), and a signal delay control signal (memory OUT timing trigger) from the signal correction unit 35 is outputted from the memory under the condition that the phases are made coincident with each other each time the correction processing of the signal is completed. Thus, the phases of the TSS signal from the waveform shaping unit 36 and the head reproduced signal agree with each other. That is, the input signal (head reproduced signal) of the A/D converter 41 and the input signal (TSS signal) of the phase comparator 37 at the first stage of the PLL loop contain the same error component as well as the frequency (1 kHz). Thus, the error components of the control clocks (MCLK1 signal, LRCLK1 and SCLK1) of the A/D converter 41 and the input signal (head reproduced signal) of the A/D converter 41 can agree with each other.

In this states the head reproduced signal inputted to the A/D converter 41 controlled by the control clock is digitized into a digital signal. Thus, the head reproduced signal is sampled by the control clock having the same error component as that of the head reproduced signal, thereby being digitized into a digital signal. As a result, the error component such as the wow and flatter is eliminated from the reproduced data. The head reproduced signal converted into the digital signal is controlled by the memory controller 42 and thereby outputted to the D/A converter 43. Although the digital data of the head reproduced signal is sequentially accumulated in the memory controller 42, this data is sequentially stored in the FIFO 44. On the other hand, the memory controller 42 supplies the digital data from the FIFO 44 to the D/A converter 43 in response to the control clocks of the above-mentioned LRCLK1 and SCLK1 outputted from the frequency divider 40. At that time, when the D/A converter 43 reconverts the reproduced signal into the analog signal by the clock accuracy (reference clock) of the quartz oscillator 45, the reproduced signal becomes a reproduced signal conforming to an ideal time base (quartz oscillator). Thus, the analog signal outputted from the D/A converter 43 can be converted into the head reproduced signal in which the error signal component generated in the tape drive system is eliminated.

Also, error signal components such as an eccentricity generated from the displacements of the rotor side and the stator side, deformation of pattern, displacements of light-emitting element and light-receiving element, rotor inclination caused when the tape is urged against the rotor, and proper circle error of the cylindrical portion relative to the rotor rotary shaft are superimposed upon the TSS source signal. In particular, the proper circle error is originally implicated in the TSS itself and detected from an FM-modulated component (so-called tape speed changed component) in the output of the FG unlike the case in which all error components except the proper circle error are detected as the output fluctuation in the form of the AM-modulated component. Thus, in the prior art, in order to eliminate this proper circle error to zero, it is necessary to rely on the proper circle degree and the cylindricity. However, since a high assembly accuracy and an assembly accuracy are difficult, wow and flatter cannot be canceled to zero by the conventional tape speed error eliminating method. However, in the sequential processing in the TBC circuit of FIG. 10, after a rotation frequency of the TSS is calculated by measuring a time of the output signal from the PG 19 of the TSS 11 and a wow and flatter component (fluctuation) of this frequency is extracted from the TSS source signal, it becomes possible to eliminate the error component of the TSS itself from the TSS source signal by adding or subtracting (time base modulation) this opposite phase wave in synchronism with the phase of the TSS source signal.

In order to eliminate the error signal component implicated in the TSS itself, it is possible to use a characteristic in which error components outputted each time the rotor 13 is rotated are substantially constant. That is, since each TSS has an FG fluctuation inherent in the reference wave, this signal is digitized into data, pre-stored in a ROM (read-only memory) memory provided within the TBC circuit and a time of the output signal from the PG 19 of the TSS is measured similarly as described above. Then, the wow and flatter can be canceled out by time-base-modulating the opposite phase wave of the data based on the calculation of the rotation frequency of the TSS.

Figure 11:
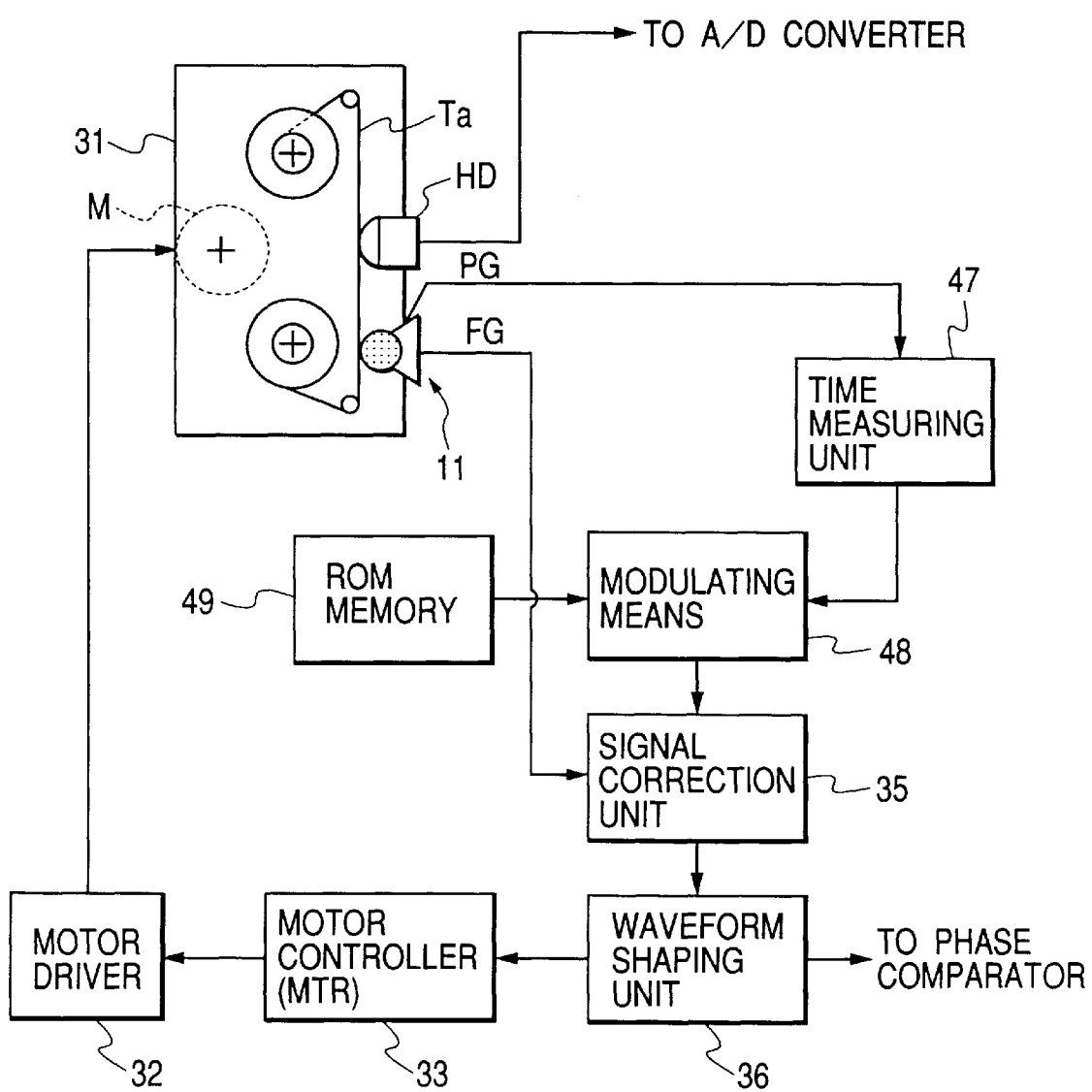
FIG. 11 is a schematic block diagram showing an arrangement in which a part of the TBC shown in FIG. 10 is formed of other arrangement.

Also, the TSS 11 has the characteristic such that the TSS 11 having the same error component is produced at the unit of lot. Thus, the error component of the TSS 11 can be approximately eliminated by using the means shown in FIG. 11, for example. FIG. 11 is a block diagram showing other arrangement of a part of the TBC shown in FIG. 10. Within the TBC circuit, there is provided a ROM 49 for memorizing representing data of error component of the TSS 11 measured at the unit of lot or approximate data. In the modulating means 48, data of the error component signal of the TSS 11 from the ROM 49 and the trigger signal from the PG 19 are connected through a time base measuring means 47 to the modulating means 48, data outputted from the ROM 49 are synchronized and a time base modulation signal is generated. On the other hand, the TSS signal detected by the FG 18 is inputted to the signal correction unit 35 and corrected by the modulating means 48 based on the time base modulated signal, whereby the error component of the TSS 11 can be approximately eliminated similarly as described above.

While the TBC circuit shown in FIG. 10 corrects the head reproduced signal by sequentially recognizing the output of the PG 18 while measuring and detecting the output, the circuit shown in FIG. 11 corrects the signal based on data previously memorized in the ROM 49.

By effecting the above-mentioned sequential processing, the displacement of the time base is prevented from being generated and a time required by the signal correction processing is reduced with the result that the signal delay unit 46 used in FIG. 10 can be made unnecessary.

In the above description, the contents memorized in the ROM 49 may be obtained by detecting the TSS signal in the initiation of the tape running, for example, and averaging such detected signal. According to this technology, it is possible to eliminate the error component of the TSS 11 more accurately.

As a consequence, since the error signals implicated in the TSS signal can be eliminated under all sorts of situations, i.e. initialization (calibration) can be executed, it becomes possible to improve a reliability of the TSS signal.

Thus, it is possible to provide a tape speed sensor which is able to detect a rotation speed and a phase with a high accuracy.

Also, in order to provide an inexpensive tape speed sensor in which a manufacturing cost may be suppressed and a finished accuracy and an assembly accuracy of each member need not be considered from a structure standpoint, the following method is effective.

Figure 12A:
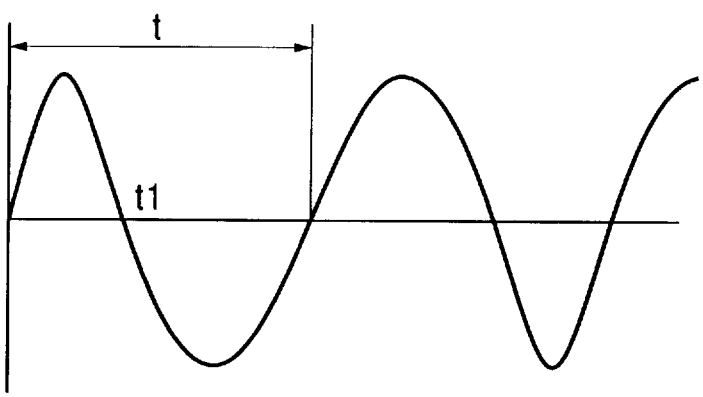
Figure 12B:
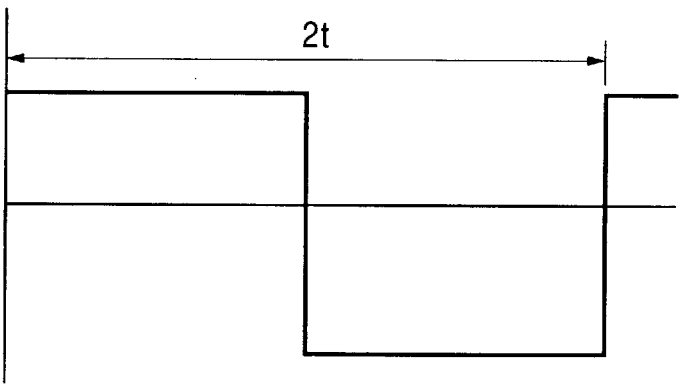
Figure 12C:
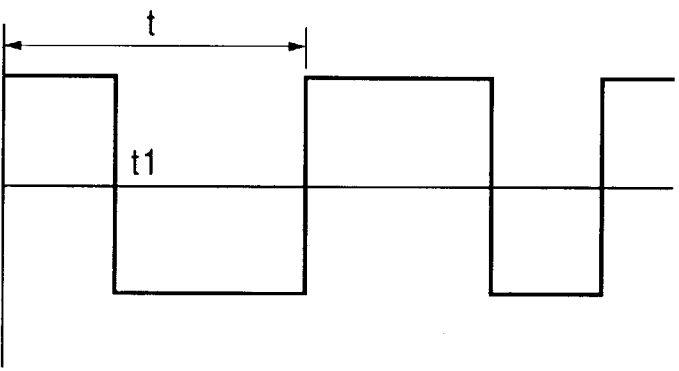
Figure 12D:
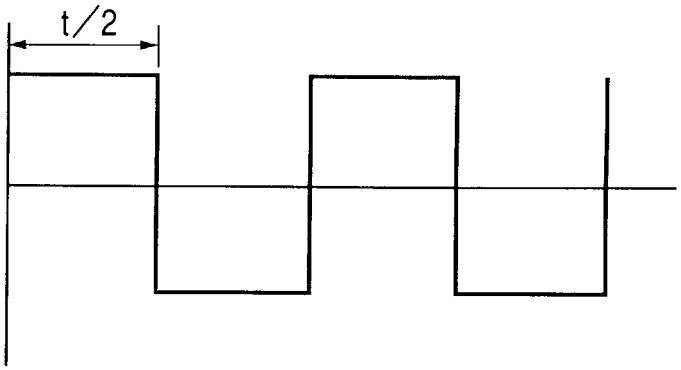
Figure 13:
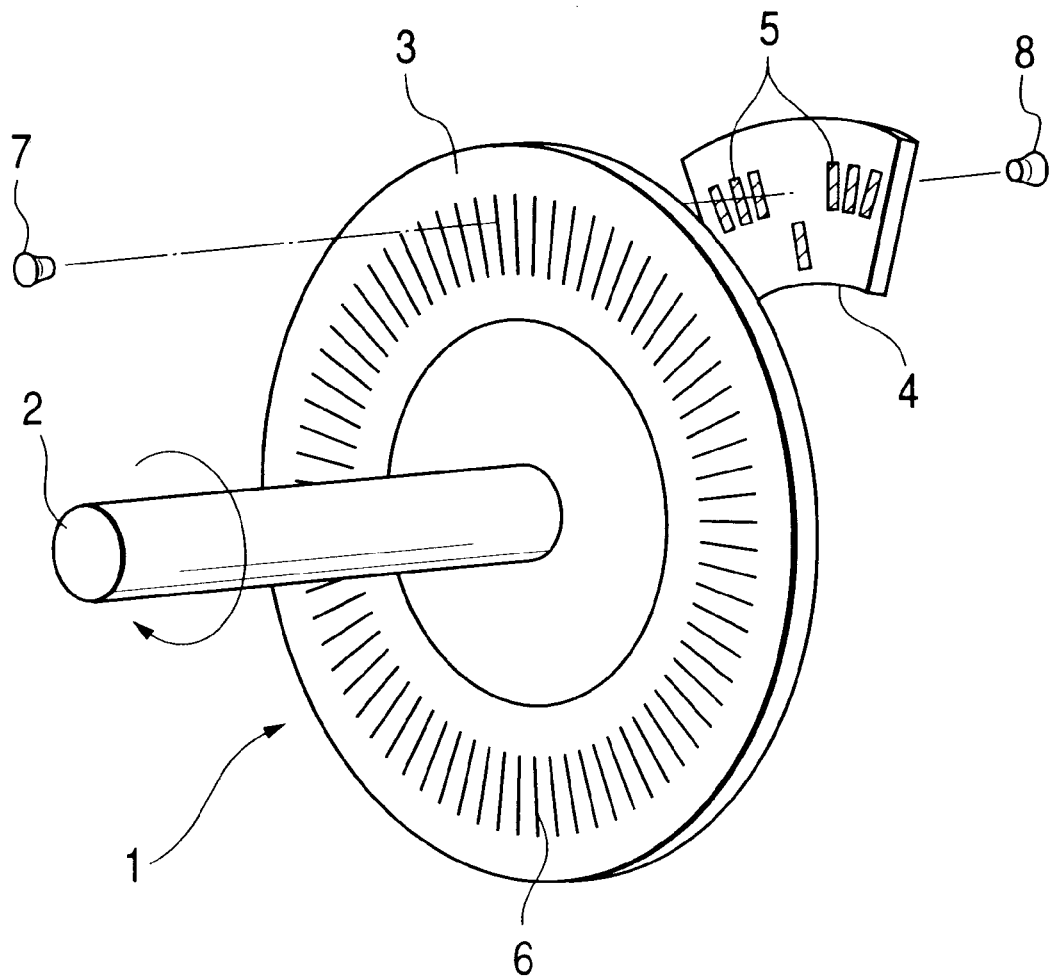
FIG. 13 is a perspective view showing a conventional rotary encoder.

FIGS. 12A through 12D are timing charts used when a TSS signal is converted into a pulse signal, respectively. FIG. 12A shows a TSS signal, FIG. 12B shows an ordinary waveform shaping, FIG. 12C shows a multiplied waveform shaping, and FIG. 12D shows a waveform shaping obtained by a pseudo-multiplication, respectively.

As described above, the TSS signal compared by the phase comparator 37 and the feedback signal from the frequency divider 40 are both held at 1 kHz. A compared voltage corresponding to a difference therebetween is outputted and applied to the voltage-controlled oscillator 39, thereby being supplied to a phase lock. In that case, in order to waveform-shape the TSS signal as shown in FIGS. 12A and 12B, the waveform shaping is generally executed with reference to a most detectable portion of a signal (in this case, a leading edge of a signal) at every cycle t of the TSS signal, and a cycle of pulse signal is set to 2t.

However, in such a low frequency (compared frequency), it is not possible to cope with the change of the tape speed within the cassette 31. Finally, there is a limit imposed on the ability for reducing the wow and flatter. Thus, it is difficult to mount such tape speed sensor on a high-definition machine.

Accordingly, as shown in FIG. 12C, with reference to the trailing edge t1 of the TSS signal, it is possible to increase the frequency of the feedback signal within the PLL loop by multiplying the pulse signal. Also, since the pulse signal is generated in synchronism with the phase of the TSS signal, a signal is converted into a pulse signal which follows the TSS signal with a higher fidelity. As a result, it becomes possible to output each control clock which can follow the error signal of the running recording tape with a higher accuracy from the PLL loop. Thus, it is possible to increase an ability for reducing a wow and flatter.

In order to accurately multiply the TSS signal originally, an accurate TSS signal has to be generated from the TSS, i.e. the TSS itself has to be formed with a high accuracy so that a manufacturing cost is increased. Accordingly, while the TSS signal, for example, is waveform-shaped by the conventional methods shown in FIGS. 12A and 12B, if a time t from the first leading edge of the TSS signal to the next leading edge is measured as shown FIG. 12D and the resultant time is forced to be divided by a half (equally divided in a pseudo-like manner) to provide t/2 and the pulse signal is multiplied, then it is possible to increase the wow and flatter reduction ability similarly as described above. That is, while the manufacturing cost of the TSS is suppressed, if the output signal from the waveform shaping unit is multiplied, then the processing ability of the TBC circuit can be increased, and the playback accuracy of the cassette 31 can be improved finally.

Thus, it is possible to reduce a time interval in which a time interval between pieces of music recorded on the tape Ta is searched at a high speed according to the prior art, for example, the time interval (about 4 seconds in the prior art) for effecting a so-called blank search may be reduced while a recognizing ratio of a blank search may be prevented from being lowered.

If the TBC circuit is combined with the tape speed sensor and the above-mentioned control method is used, then it becomes possible to provide an inexpensive tape speed sensor in which a manufacturing cost may be suppressed and a finished accuracy and an assembly accuracy of each member need not be considered from a structure standpoint.

Incidentally, if the reproducing head HD provided in the cassette 31 is replaced with a recording head and the A/D converter 41 and the D/A converter 43 are exchanged from each other, it is possible to construct a circuit (TBM (time base modulation)) which controls the capstan-less tape recording apparatus. Also in this case, the apparatus can be controlled similarly as described above.

According to the present invention as set forth above, the accurate cycle of the envelope signal of the slit portions obtained through the FG can be detected and electrically processed, whereby the error component in the envelope signal can be eliminated.

Thus, it is possible to control a tape running speed of a capstan-less tape reproducing apparatus by this tape speed sensor (TSS). Also, in this case, if this tape speed sensor is used together with a control circuit of the recording system, all mechanical errors can be eliminated from the reproduced signal. Consequently, it becomes possible to reduce the wow and flatter or the like to zero from a theory standpoint.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A tape speed sensor including a rotor whose outer circumferential surface contacts with a running tape and which has a translucent cylindrical portion; a supporting member for pivotally supporting this rotor; a light-emitting element for introducing light into said cylindrical portion of said rotor; slits formed around both of an end face of said cylindrical portion of said rotor and said supporting member opposed to this end face along a circumference direction at a predetermined pitch; and a first light-receiving element for a rotation speed detection for receiving light passed through said cylindrical portion of said rotor and passed through said slits, partial pass bands for partly passing light emitted from said light-emitting element to the outside from the outer peripheral surface of said rotor being formed at one place on said rotor, and a second light-receiving element for rotation phase detection for detecting light passed through said pass bands and for outputting a trigger signal of one pulse each time said rotor rotates once in order to detect a rotation cycle being provided on the outer peripheral portion of said rotor.

2. A tape speed sensor according to claim 1, wherein said cylindrical portion is located outwardly of the center of the rotor, and there is provided a reflection portion for reflecting light irradiated from said light-emitting element radially from the rotation center side of said rotor to said cylindrical portion of said rotor, a reflection surface for reflecting radially reflected light in the direction of said slits from said cylindrical portion is formed on said rotor in a peripheral fashion, a part of the peripheral reflection surface formed on said rotor is made as a non-reflection shape and said non-reflection shape portion is formed as said pass band.

3. A control circuit for controlling the tape speed sensor as claimed in claim 1, comprising a motor servo system for controlling a rotation of a tape by feeding back an output from said tape speed sensor, a PLL loop for generating a control clock from the output from said tape speed sensor, a signal delay unit for delaying a reproduced signal from a head, an A/D converter for A/D-converting a head output signal from said signal delay unit by using said control clock, a memory controller for controlling said A/D-converted digital signal, a memory for storing said digital signal, a D/A converter for reconverting said digital signal into an analog signal by said memory controller and a reference clock for controlling said memory controller and said D/A converter.

4. A control circuit according to claim 3, wherein individual error signals are converted relative to a reference wave of the tape speed sensor into data, said data being pre-stored in ROM, and further wherein an error signal is erased from a source signal outputted from said tape speed sensor by time-base-modulating an opposite phase wave of said data based on a time base of a trigger signal outputted from a second light-receiving element for rotation phase detection.

5. A control circuit according to claim 4, wherein representing data or approximate data in each production lot for said tape speed sensor is used as data of the error component pre-stored in ROM.

6. A control circuit according to claim 3, wherein said control clock is generated from said PLL loop after an output signal from said tape speed sensor is multiplied.

7. A control circuit according to claim 6, wherein said control clock generated in said PLL loop is time-base-modulated in response to the change of tape speed and when a head reproduced signal is reconverted into the analog signal by said reference clock after said head reproduced signal is A/D-converted by said control clock, and at that time said A/D-converted reproduced signal is time-base-modulated in accordance with an error component generated when a tape is transported.

8. A tape speed sensor including a rotor whose outer circumferential surface contacts with a running tape and which has a translucent cylindrical portion; a supporting member for pivotally supporting this rotor; a light-emitting element for introducing light into said cylindrical portion of said rotor; slits formed around both of an end face of said cylindrical portion of said rotor and said supporting member opposed to this end face along a circumference direction at a predetermined pitch; and a first light-receiving element for a rotation speed detection for receiving light passed through said cylindrical portion of said rotor and passed through said slits, partial non-pass bands for partly shielding light passed to the outside from the outer peripheral surface of said rotor being formed at one place on said rotor, and a second light-receiving element for rotation phase detection for detecting the shielding of light by said non-pass bands and for outputting a trigger signal of one pulse each time said rotor rotates once in order to detect a rotation cycle being provided on the outer peripheral portion of said rotor.

9. A tape speed sensor according to claim 8, wherein said cylindrical portion is located outwardly of the center of the rotor, and there is provided a reflection portion for radially reflecting light irradiated from said light-emitting element from the rotation center side of said rotor to said cylindrical portion of said rotor, a reflection surface for reflecting said radially reflected light from said cylindrical portion to said slit direction and passing a part of light is formed on said rotor in a peripheral fashion, a shielding portion for partly shielding light which is passed through said peripheral reflection surface and emitted to the outer peripheral direction is formed on said rotor, and this shielding portion is formed as said non-pass band.

10. A control circuit for controlling the tape speed sensor as claimed in claim 8, comprising a motor servo system for controlling a rotation of a tape by feeding back an output from said tape speed sensor, a PLL loop for generating a control clock from the output from said tape speed sensor, a signal delay unit for delaying a reproduced signal from a head, an A/D converter for A/D-converting a head output signal from said signal delay unit by using said control clock, a memory controller for controlling said A/D-converted digital signal, a memory for storing said digital signal, a D/A converter for reconverting said digital signal into an analog signal by said memory controller and a reference clock for controlling said memory controller and said D/A converter.

11. A control circuit according to claim 10, wherein individual error signals are converted relative to a reference wave of the tape speed sensor into data, said data being pre-stored in ROM, and further wherein an error signal is errased from a source signal outputted from said tape speed sensor by time-base-modulating an opposite phase wave of said data based on a time base of a trigger signal outputted from a second light-receiving element for rotation phase detection.

12. A control circuit according to claim 11, wherein representing data or approximate data in each production lot for said tape speed sensor is used as data of the error component pre-stored in ROM.

13. A control circuit according to claim 10, wherein said control clock is generated from said PLL loop after an output signal from said tape speed sensor is multiplied.

14. A control circuit according to claim 13, wherein said control clock generated in said PLL loop is time-base-modulated in response to the change of tape speed and when a head reproduced signal is reconverted into the analog signal by said reference clock after said head reproduced signal is A/D-converted by said control clock, and at that time said A/D-converted reproduced signal is time-base-modulated in accordance with an error component generated when a tape is transported.

* * * * *